(12) United States Patent
Liu et al.

(10) Patent No.: US 8,092,884 B2
(45) Date of Patent: Jan. 10, 2012

(54) SINGLE LAYER FUEL TANK

(75) Inventors: Zhenguo Liu, Flanders, NJ (US);
Stephen J. Hanley, Lebanon, NJ (US);
Frank Aadahl, Bound Brook, NJ (US)

(73) Assignee: BASF SE, Rheinland-Pfalz (DE)

( * ) Notice: Subject to any disclaimer, the term of this patent is extended or adjusted under 35 U.S.C. 154(b) by 399 days.

(21) Appl. No.: 12/496,913

(22) Filed: Jul. 2, 2009

(65) Prior Publication Data
US 2011/0000127 A1   Jan. 6, 2011

(51) Int. Cl.
*B29D 22/00* (2006.01)
*B29D 23/00* (2006.01)
*B32B 1/08* (2006.01)

(52) U.S. Cl. ............... 428/36.92; 428/35.7; 428/474.4; 210/600; 210/696; 210/767

(58) Field of Classification Search ............... 428/35.7, 428/36.92, 474.4; 210/600, 696, 767
See application file for complete search history.

(56) References Cited

U.S. PATENT DOCUMENTS

| | | | |
|---|---|---|---|
| 5,492,947 A | 2/1996 | Wood et al. | |
| 5,928,745 A * | 7/1999 | Wood et al. | ............... 428/36.6 |
| 6,117,328 A | 9/2000 | Sikdar et al. | |
| 6,136,354 A | 10/2000 | Wood et al. | |
| 6,306,936 B1 | 10/2001 | Wood et al. | |
| 6,391,946 B2 | 5/2002 | Wood et al. | |
| 6,491,994 B1 | 12/2002 | Kito et al. | |
| 7,166,671 B2 | 1/2007 | Wood et al. | |
| 7,365,123 B2 | 4/2008 | Wood et al. | |
| 7,385,004 B2 | 6/2008 | Wood | |
| 2002/0113694 A1 | 8/2002 | Muirhead | |
| 2003/0049398 A1 | 3/2003 | Ellis | |
| 2003/0108704 A1 | 6/2003 | Yano et al. | |
| 2003/0108734 A1 | 6/2003 | Yano et al. | |
| 2003/0191222 A1 | 10/2003 | Suzuki et al. | |
| 2005/0159557 A1 | 7/2005 | Fukushi et al. | |
| 2005/0261426 A1 | 11/2005 | Wood et al. | |
| 2006/0013973 A1 | 1/2006 | Flaconneche et al. | |

(Continued)

FOREIGN PATENT DOCUMENTS
DE   19814298 A1   10/1999
(Continued)

OTHER PUBLICATIONS

English language abstract for DE 19814298 extracted from espacenet.com database, dated Apr. 30, 2010, 5 pages.
English language abstract for DE 10114872 extracted from espacenet.com database, dated Apr. 30, 2010, 5 pages.

(Continued)

*Primary Examiner* — Michael C Miggins
(74) *Attorney, Agent, or Firm* — Howard & Howard Attorneys PLLC (57) ABSTRACT

A single layer fuel tank includes a polyamide component, an impact modifier, and a binding filler. The polyamide component has a polyamide selected from the group of polyamide 6, polyamide 6/6, polyamide 6/66, and combinations thereof. The polyamide component also includes up to 5 parts by weight of polyamide oligomers per 100 parts by weight of the polyamide component. The impact modifier is an organic copolymer and is present in an amount of up to 30 parts by weight per 100 parts by weight of the fuel tank. The binding filler is not covalently bonded to the polyamide and includes at least one of a silica and a cyclodextrin. In addition, the binding filler is present in an amount of up to 10 parts by weight per 100 parts by weight of the fuel tank.

25 Claims, 5 Drawing Sheets

U.S. PATENT DOCUMENTS

| | | |
|---|---|---|
| 2006/0014011 A1 | 1/2006 | Flaconneche et al. |
| 2006/0182917 A1 | 8/2006 | Wood et al. |
| 2006/0183857 A1 | 8/2006 | Wood et al. |
| 2006/0205873 A1 | 9/2006 | Wood et al. |
| 2007/0100047 A1 | 5/2007 | Sukhadia et al. |
| 2007/0264520 A1 | 11/2007 | Wood et al. |
| 2008/0032110 A1 | 2/2008 | Wood et al. |
| 2008/0197528 A1 | 8/2008 | Wood |

FOREIGN PATENT DOCUMENTS

| | | |
|---|---|---|
| DE | 10114872 A1 | 9/2002 |
| EP | 0475064 A1 | 3/1992 |
| EP | 0694574 A1 | 1/1996 |
| EP | 0810259 A1 | 12/1997 |
| EP | 1108598 A2 | 6/2001 |
| EP | 1457521 A1 | 9/2004 |
| EP | 1503069 A1 | 2/2005 |
| JP | 58112950 A | 7/1983 |
| JP | 63033252 A | 2/1988 |
| JP | 1149838 A | 6/1989 |
| JP | 08053535 A | 2/1996 |
| JP | 2004002605 A | 1/2004 |
| JP | 2004051681 A | 2/2004 |
| JP | 2004099865 A | 4/2004 |
| JP | 2004155942 A | 6/2004 |
| JP | 2004182826 A | 7/2004 |
| JP | 2004285192 A | 10/2004 |
| JP | 2004331883 A | 11/2004 |
| JP | 2005015519 A | 1/2005 |
| JP | 2006299254 A | 11/2006 |
| SU | 1204321 A1 | 1/1986 |
| WO | WO 9730123 A1 | 8/1997 |
| WO | WO 0056520 A1 | 9/2000 |
| WO | WO 02079318 A2 | 10/2002 |
| WO | WO 03097227 A1 | 11/2003 |
| WO | WO 03106170 A1 | 12/2003 |
| WO | WO 03106548 A2 | 12/2003 |
| WO | WO 2004009649 A1 | 1/2004 |

OTHER PUBLICATIONS

English language abstract for EP 0694574 extracted from espacenet.com database, dated Apr. 30, 2010, 9 pages.
English language abstract for EP 0810259 extracted from espacenet.com database, dated Apr. 30, 2010, 7 pages.
English language abstract for JP 58112950, 6 pages.
English language abstract for JP 63033252, 4 pages.
English language abstract for JP 1149838 extracted from espacenet.com database, dated Apr. 30, 2010, 5 pages.
English language translation and abstract for JP 08053535 extracted from PAJ database, dated Apr. 30, 2010, 30 pages.
English language translation and abstract for JP 2004002605 extracted from PAJ database, dated Apr. 30, 2010, 152 pages.
English language translation and abstract for JP 2004051681 extracted from PAJ database, dated Apr. 30, 2010, 173 pages.
English language translation and abstract for JP 2004099865 extracted from PAJ database, dated Apr. 30, 2010, 177 pages.
English language translation and abstract for JP 2004155942 extracted from PAJ database, dated Apr. 30, 2010, 148 pages.
English language translation and abstract for JP 2004182826 extracted from PAJ database, dated May 3, 2010, 96 pages.
English language translation and abstract for JP 2004285192 extracted from PAJ database, dated Apr. 30, 2010, 141 pages.
English language translation and abstract for JP 2004331883 extracted from PAJ database, dated May 3, 2010, 144 pages.
English language translation and abstract for JP 2005015519 extracted from PAJ database, dated May 3, 2010, 134 pages.
English language translation and abstract for JP 2006299254 extracted from PAJ database, dated May 3, 2010, 58 pages.
English language abstract for SU 1204321, 3 pages.
English language abstract for WO 03106170 extracted from espacenet.com database, dated Apr. 30, 2010, 18 pages.
English language abstract for WO 03106548 extracted from espacenet.com database, dated Apr. 30, 2010, 11 pages.
Research Disclosure No. 381049, 3 pages.

* cited by examiner

SINGLE LAYER FUEL TANK

FIELD OF THE INVENTION

The present invention generally relates to a single layer fuel tank. More specifically, the single layer fuel tank includes a polyamide component, an impact modifier, and a binding filler.

DESCRIPTION OF THE RELATED ART

Fuel tanks for machines such as motor vehicles, farm implements, and small gasoline powered tools have been the focus of recent design changes and improvements. Many of these fuel tanks are formed from composite materials, thermosetting materials, or thermoplastic materials such as polyethylene or polypropylene. Some fuel tanks include natural or synthetic fibers, metallic fibers, metallic layers, and coatings derived from both aqueous and solvent borne compositions to increase mechanical strength and chemical resistance of the particular material that the fuel tank is formed from. All of these fuel tanks are typically rigid, structurally resilient, and able to withstand repeated heating and freezing cycles. However, these fuel tanks are usually heavy, bulky, and expensive to produce.

Other fuel tanks, which are lighter and less expensive to produce, have also been developed for use with various machines. These fuel tanks are typically formed from a single layer of thermoplastic, composite, or thermosetting materials such as nitrites, polycarbonates, and polyamides. However, fuel tanks formed from polyamides, for example, are subject to chemical degradation from fuel contained therein. Fuels which include ethanol tend to extract low molecular weight dimers, trimers, and oligomers from polyamide fuel tanks which results in contaminated fuels, clogged fuel filters, decreased machine performance, and degradation of the fuel tanks themselves.

Accordingly, there remains an opportunity to develop an improved fuel tank that is structurally resilient, light weight, able to withstand repeated heating and freezing cycles, able to resist impact, and resistant to chemical degradation and oligomer extraction. There also remains an opportunity to reduce an amount of extracted oligomers in a fuel using such a fuel tank.

SUMMARY OF THE INVENTION AND ADVANTAGES

The instant invention provides a single layer fuel tank including a polyamide component, an impact modifier, and a binding filler. The polyamide component has a polyamide selected from the group of polyamide 6, polyamide 6/6, polyamide 6/66, and combinations thereof. The polyamide component also has up to 5 parts by weight of polyamide oligomers having a number average molecular weight of less than about 3,000 g/mol per 100 parts by weight of the polyamide component. Furthermore, the impact modifier is an organic copolymer and is present in an amount of up to 30 parts by weight per 100 parts by weight of the single layer fuel tank. In addition, the binding filler includes at least one of a silica and a cyclodextrin, is not covalently bonded to the polyamide, and is present in an amount of up to 10 parts by weight per 100 parts by weight of the single layer fuel tank.

The instant invention also provides a method of minimizing an amount of extracted polyamide in a fuel having at least 10 percent by volume of ethanol. The method includes the steps of combining the polyamide component, the impact modifier, and the binding filler to form a mixture. The method also includes the steps of forming the single layer fuel tank from the mixture. The method further includes the step of adding and retaining the fuel in the single layer fuel tank and the step of removing the fuel from the single layer fuel tank, wherein the fuel has a minimized amount of extracted polyamide oligomers therein.

Due to its chemical makeup, the single layer fuel tank of this invention is structurally resilient, lightweight, able to withstand repeated heating and freezing cycles, able to resist impact, and resistant to chemical degradation and oligomer extraction therefrom. The polyamide reduces weight, increases chemical resistance, and contributes to strength and structural resilience of the single layer fuel tank. The impact modifier contributes to an ability of the single layer fuel tank to withstand impact, resist denting, and resist cracking in both hot and cold environments. The binding filler, which is not covalently bonded to the polyamide, minimizes extraction of the polyamide oligomers by the fuel thereby reducing contamination of the fuel, clogging of fuel filters, and degradation of the single layer fuel tank. Because the binding filler is not covalently bonded to the polyamide, the binding filler can more effectively form host-guest complexes due to molecular size, has more freedom to bind the polyamide oligomers, and has additional functional groups that can interact with the polyamide oligomers, all leading to increased binding, and decreased extraction, of the polyamide oligomers.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
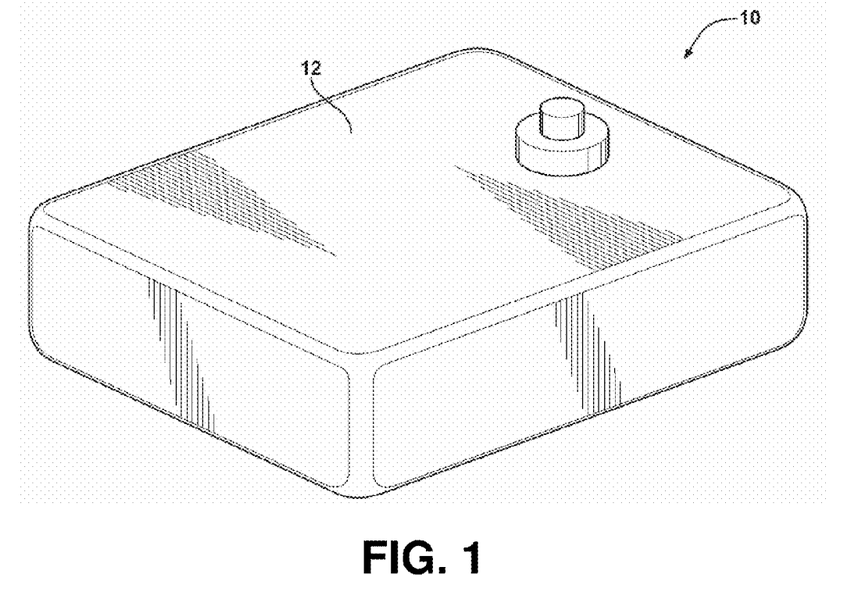
FIG. 1 is a perspective side view of one embodiment of a single layer fuel tank of this invention.
Figure 2:
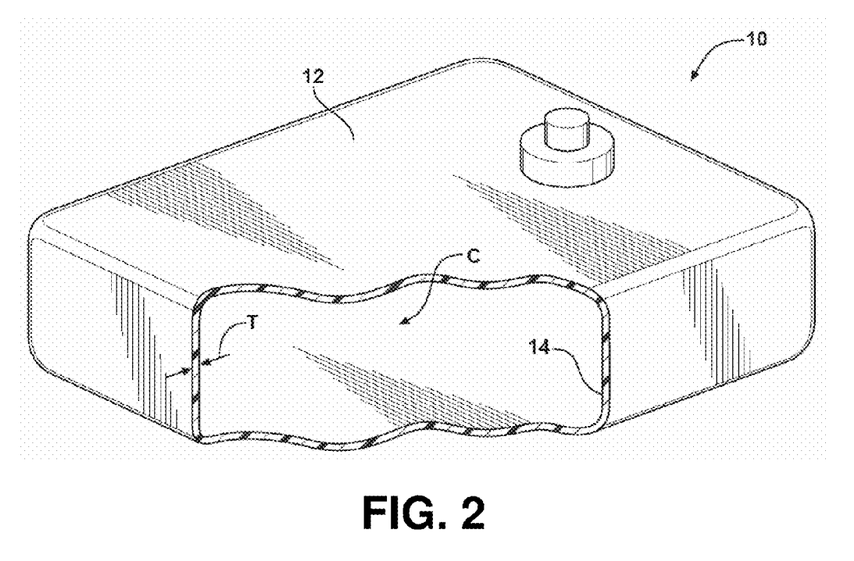
FIG. 2 is a cross-sectional view of the single layer fuel tank of FIG. 1.

The instant invention provides a single layer fuel tank (10), as set forth in FIGS. 1 and 2, that contains a fuel and can be used in conjunction with any commercial, residential, or consumer machine, vehicle, carriage, or apparatus that includes a fueled engine. Typically, the single layer fuel tank (10) is used in conjunction with consumer, lawn care, agricultural, and construction machines including, but not limited to, automobiles, tractors, log splitters, generators, pressure washers, air compressors, pumps, outboard motors, snow and leaf blowers, trimmers, tillers, shredders, and the like. Alternatively, the single layer fuel tank (10) may be used independently from any machine, and may be further defined as a commercial or consumer portable or stationary single layer fuel tank (10). In various embodiments, the single layer fuel tank (10) is further defined as an in-ground or above ground commercial single layer fuel tank (10). In still other embodiments, the single layer fuel tank (10) is further defined as a portable commercial single layer fuel tank (10) that may be transported via air, rail, sea, or road. The single layer fuel tank (10) may be of unitary construction or many include two or more components connected together. Typically, the single layer fuel tank (10) is of unitary construction (i.e., it is one piece).

As also set forth in FIGS. 1 and 2, the single layer fuel tank (10) has an outer surface (12) and an inner surface (14), which define both outer and inner dimensions of the single layer fuel tank (10), respectively. Both the outer and inner surfaces (12, 14) may independently be of any size, shape, and texture and typically have box-like, rectangular, spherical, or cylindrical shapes. The outer surface (12) is typically rough and designed to provide structural, chemical, and thermal protection to both the single layer fuel tank (10) and the fuel contained therein. The inner surface (14) is typically smooth and is also designed to protect the fuel. The single layer fuel tank (10) typically has a thickness (T) of from 0.03 to 0.25, more typically of from 0.08 to 0.17, and most typically of from 0.1 to 0.15, inches.

As shown in FIG. 2, the inner surface (14) of the single layer fuel tank (10) defines a cavity (C). The cavity (C) contains the fuel and is in direct contact with the fuel. The cavity (C) defines a capacity of the single layer fuel tank (10) relative to an amount of fuel that can be contained therein. In one embodiment, the single layer fuel tank (10) has a capacity of from 0.1 to 100 gallons of fuel. In various other embodiments, the single layer fuel tank (10) has a capacity of from 0.1 to 10 gallons of fuel, from 0.1 to 3 gallons of fuel, from 0.1 to 2 gallons of fuel, from 1 to 2 gallons of fuel, from 10 to 50 gallons of fuel, or from 50 to 100 gallons of fuel. In one embodiment, the single layer fuel tank (10) has a capacity of from 0.1 to 3 gallons of fuel and is used in conjunction with a consumer lawn/garden apparatus. In another embodiment, the single layer fuel tank (10) has a capacity of from 10 to 50 gallons of fuel and the fuel is further defined as diesel fuel. In still other embodiments, the single layer fuel tank (10) has a capacity up to and exceeding 10,000 gallons of fuel. In another embodiment, the single layer fuel tank (10) is further defined as a portable commercial single layer fuel tank (10) that has a capacity of from 7,500 to 10,000 gallons of fuel. In still another embodiment, the single layer fuel tank (10) is further defined as a portable commercial single layer fuel tank (10) that has a capacity greater than 10,000 gallons of fuel. Of course it is to be understood that the single layer fuel tank (10) of this invention is not limited to the aforementioned capacities.

The fuel contained by the single layer fuel tank (10) is not limited in type but typically includes at least 1, more typically at least 3, still more typically at least 5, and most typically at least 10, percent by volume of an alcohol such as methanol, ethanol, butanol, propanol, and isopropanol, or derivatives thereof. Most typically, the alcohol is further defined as ethanol. In various embodiments, the fuel includes at least 25, 50, 75, 85, or 95, percent by volume of ethanol. In one embodiment, the fuel is commonly known as E85 and includes up to about 85% by volume of denatured ethanol or from about 70% to 83% by volume of undenatured ethanol. In still a further embodiment, the fuel includes approximately 100 percent by volume of ethanol. Most typically, the fuel is further defined as gasoline having an octane of from 80 to 110, from 85 to 105, or from 87 to 94. As is well known in the art, gasoline typically includes from 30 to 50 weight percent by weight of aliphatic straight chain and branched hydrocarbons such as heptane and iso-octane, from 20 to 30 weight percent of cyclic aliphatic hydrocarbons such as cyclopentane, and from 20 to 30 weight percent of aromatic compounds such as ethyl benzene. In other embodiments, the fuel is further defined as diesel, low sulfur diesel, ultra low sulfur diesel (ULSD), bio-diesel, biomass to liquid (BTL) diesel, gas to liquid (GTL) diesel, and combinations thereof.

The single layer fuel tank (10) includes a polyamide component that has a polyamide that is selected from the group of polyamide 6, polyamide 6,6, polyamide 6/66, and combinations thereof. Polyamide 6 is also known as polycaprolactam and is commercially available from BASF Corporation under the trade names Ultramid® B, Ultramid® B3, Ultramid® B32, Ultramid® B36 Ultramid® B36 LN, Ultramid® B40 L, Ultramid® B40 LN, and Ultramid® B50 L 01. Polyamide 6,6 is a copolymer of hexamethylene diamine and adipic acid and is commercially available from BASF Corporation under the trade names Ultramid® A, Ultramid® A27 E 01, Ultramid® A34 01, and Ultramid® A44 01. Polyamide 6/66 is a copolymer of polyamide 6 and polyamide 66 and is commercially available from BASF Corporation under the trade name of Ultramid® C, Ultramid® C33 01, Ultramid® C33L 01, Ultramid® C33LN 01, Ultramid® C3U, Ultramid® C3U BK23079, Ultramid® C40 L 01, and Ultramid® C40LX01.

The polyamide component also includes up to 5 parts by weight of the polyamide oligomers per 100 parts by weight of the polyamide component. In various embodiments, the polyamide component has from 1 to 5, from 2 to 5, or from 2 to 3, parts by weight of the polyamide oligomers per 100 parts by weight of the polyamide component. Accordingly, the polyamide component typically has at least 95, more typically at least 96, still more typically at least 97, and most typically at least 98, parts by weight of the polyamide per 100 parts by weight of the polyamide component.

The polyamide oligomers have a number average molecular weight of less than about 3,000 g/mol. More typically, the polyamide oligomers have a number average molecular weight of less than 2,000 g/mol. Still more typically, the polyamide oligomers have a number average molecular weight of less than 1,500 g/mol. As is well recognized in the art, the terminology "polyamide oligomers" refers to low molecular weight polyamide polymers in which a number of repeating amide units is between approximately two and ten. In other words, the terminology polyamide "oligomers" typically refers to polyamides that are classified as dimers, trimers, tetramers, pentamers, hexamers, heptamers, octamers, nonamers, and decamers of caprolactam, hexamethylene diamine, adipic acid, nylon 6, nylon 6,6, and/or combinations thereof. A general chemical structure of a typical, but non-limiting, polyamide oligomer is set forth below wherein n is a number between approximately 2 and 10.

Polyamide 6,6 Oligomer

The single layer fuel tank (10) typically has of from 60 to 99, more typically of from 70 to 99, and most typically of from 75 to 99, parts by weight of the polyamide component per 100 parts by weight of the single layer fuel tank (10). In one embodiment, the single layer fuel tank (10) includes an impact modifier, a binding filler, and a balance of the polyamide component. In another embodiment, the single layer fuel tank (10) includes the impact modifier, the binding filler, the polyamide component, and one or more additives. The impact modifier, the binding filler, and the additives are described in greater detail below.

Referring now to the impact modifier, the impact modifier is thought to increase weatherability, low-temperature impact resistance, toughness and both mechanical and chemical durability of the single layer fuel tank (10). The impact modifier is an organic copolymer and is typically selected from the group of maleated ethylene propylene rubbers (EPR), functionalized ethylene-octene copolymer, styrene-ethylene-polybutadiene copolymer (SEBS), core-shell modifiers, ethylene methacrylic acid, ionomers thereof, salts thereof, and combinations thereof. In one embodiment, the organic copolymer is further defined as ethylene propylene rubber (EPR). In another embodiment, the organic copolymer is further defined as functionalized ethylene-octene copolymer. In still a further embodiment, the organic copolymer is further defined as styrene-ethylene-polybutadiene copolymer (SEBS). In yet another embodiment, the organic copolymer is further defined as ethylene methacrylic acid. It is contemplated that ionomers of the aforementioned organic copolymers may be used and may include, for example, zinc or sodium salts of the ionomers. Of course, the impact modifier is not limited to those described above and may be further defined as any impact modifier known in the art that is an organic copolymer.

In addition, the impact modifier is present in an amount of up to 30 parts by weight per 100 parts by weight of the single layer fuel tank (10). In various embodiments, the impact modifier is present in amounts of from 1 to 30, from 5 to 30, from 10 to 30, from 20 to 30, from 15 to 25, from 15 to 30, from 18 to 22, or of about 20, parts by weight per 100 parts by weight of the single layer fuel tank (10). Typically, the amount of the impact modifier used to form the single layer fuel tank (10) is related to the amount of the binding filler used, as described in greater detail below. Preferably, the impact modifier is utilized in an amount sufficient to provide the single layer fuel tank (10) with a desired level of resistance to dents and cracks.

Referring now to the binding filler, it is believed that the binding filler binds, compounds, or "chelates" the polyamide oligomers thereby minimizing an amount of the polyamide oligomers that can be extracted by the fuel or that can leach into the fuel. It is also believed that pore size of the binding filler and/or number of functional groups (such as —OH groups) affects the ability of the binding filler to bind the polyamide oligomers. Typically, the pore size and/or functional groups of the binding filler allow for interaction of the binding filler with the polyamide oligomers through hydrogen bonding, London Forces, and/or Dipole-Dipole interactions. In other embodiments, the binding filler has various pore sizes, as selected by one of skill in the art. In still other embodiments, the binding filler has hydroxyl, carboxyl, or other functional groups.

The binding filler includes at least one of a silica (silicon dioxide) and a cyclodextrin. In one embodiment, the binding filler includes silica. In this embodiment, the binding filler may be substantially free of one or more cyclodextrins. The terminology "substantially free," as used immediately above, refers to an amount of cyclodextrins of less than 0.1, more typically of less than 0.01, and most typically of less than 0.001, parts by weight per 100 parts by weight of the binding filler. In another embodiment, the binding filler consists essentially of silica. In this embodiment, the binding filler includes less than 1 percent by weight, and most preferably is free of, other metals, oxides, carbohydrates, or fillers known in the art. In still a further embodiment, the binding filler consists of silica.

The silica may be crystalline, amorphous, or a combination thereof. In one embodiment, the silicon is amorphous and is further defined as fused silica. In alternative embodiments, the silica is further defined as fumed silica, precipitated silica, or silica gel. Still further, the silica may be further defined as crystalline silica and have one or more of the following forms: α- or β-quartz, α- or β-tridymite, α- or β-cristobalite, keatite, coesite, stishovite, melanophlogite, or fibrous.

Suitable binding fillers including silica are commercially available from PPG under the trade name of Hi-Sil®. A specific form of Hi-Sil® that is particularly useful in this invention is Hi-Sil® ABS. As is known in the art, Hi-Sil® ABS is a white precipitated silica powder with an approximately uniform spherical shape and a median agglomerate diameter of about 20 micrometers. Hi-Sil® ABS is also amorphous and porous having a surface area of about 150 $m^2/g$.

In an additional embodiment, the binding filler includes silica and aluminum oxide. In this embodiment, the binding filler may be substantially free of one or more cyclodextrins. The terminology "substantially free," as used immediately above, refers to an amount of cyclodextrins of less than 0.1, more typically of less than 0.01, and most typically of less than 0.001, parts by weight per 100 parts by weight of the binding filler. In still another embodiment, the binding filler consists essentially of silica and aluminum oxide. In this embodiment, the binding filler includes less than 1 percent by weight, and most preferably is free of, other metals, oxides, carbohydrates, or fillers known in the art. In another embodiment, the binding filler includes only silica and aluminum oxide. In still a further embodiment, the binding filler consists of silica and aluminum. When the binding filler includes the silica and aluminum oxide, the silica is typically present in an amount of greater than 60 parts by weight while the aluminum is typically present in an amount of less than 40 parts by weight, per 100 parts by weight of the binding filler. However, the binding filler is not limited to these amounts of the silica and the aluminum oxide. Suitable binding fillers including silica and aluminum oxide are commercially available from 3M under the trade name of Zeeosphere®. Specific forms of Zeeosphere® which are particularly useful include, but are not limited to, G-200, G-400, G-600, G-800, G-850, W-210, W-410, and W-610.

In still another embodiment, the binding filler includes a cyclodextrin. In this embodiment, the binding filler may be substantially free of one or more silicas and/or metal oxides. The terminology "substantially free," as used immediately above, refers to an amount of silicas and/or metal oxides of less than 0.1, more typically of less than 0.01, and most typically of less than 0.001, parts by weight per 100 parts by weight of the binding filler. Alternatively, the binding filler may consist essentially of the cyclodextrin and include less than 1 percent by weight, and most preferably be free of, metals, oxides, other carbohydrates, or fillers known in the art. Still further, the binding filler may consist of the cyclodextrin.

It is well known in the art that the terminology "cyclodextrin" includes cycloamyloses and typically refers to a family of cyclic oligosaccharides including of 5 or more α-D-glucopyranoside units linked together. A generic chemical structure of one α-D-glucopyranoside unit is set forth below wherein carbon atoms are traditionally numbered and n is a positive number.

Figure 3A:
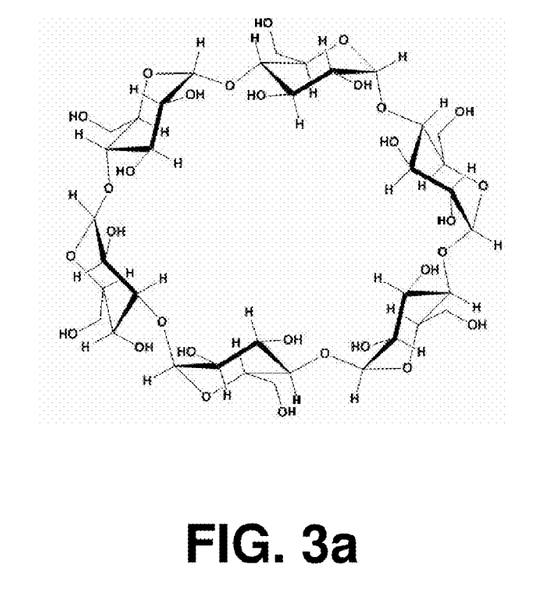
FIG. 3a is a chemical structure of α-cyclodextrin which is one possible binding filler of the instant invention.
Figure 3B:
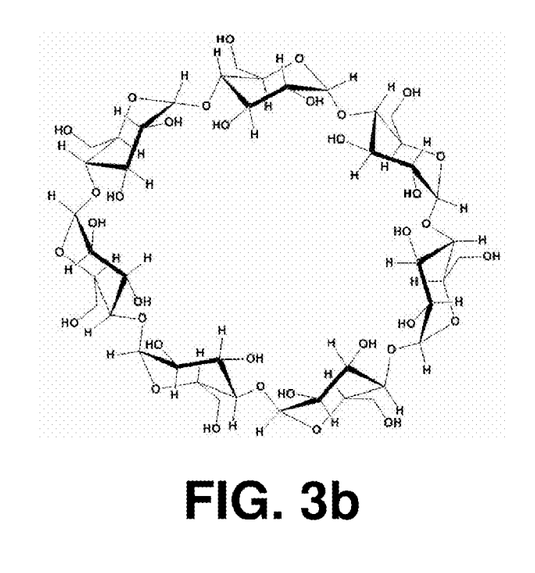
FIG. 3b is a chemical structure of β-cyclodextrin which is another possible binding filler of the instant invention.
Figure 3C:
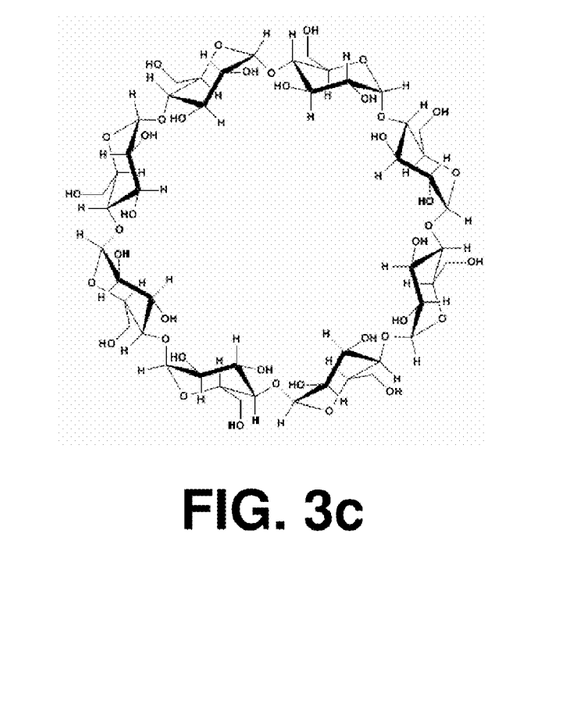
FIG. 3c is a chemical structure of γ-cyclodextrin which is yet another possible binding filler of the instant invention.

The cyclodextrin of this invention may be modified or unmodified and typically includes from six to eight α-D-glucopyranoside units bonded in a ring. Unmodified cylodextrins that are six, seven, and eight membered α-D-glucopyranoside rings are commonly known as α-, β-, γ-cyclodextrins, respectively. The chemical structures of α-, β-, and γ-cyclodextrin are set forth in FIGS. 3a, 3b, and 3c, respectively.

Without intending to be bound by any particular theory, it is believed that primary and second hydroxyl groups (at the six, two, and three positions) of the cyclodextrin allow the cyclodextrin to be modified at any or all of these positions. Modified cyclodextrins typically have pendent groups at the two, three, and/or six positions that render the modified cyclodextrin compatible with the polyamide component and/or the impact modifier such that the modified cyclodextrin can be uniformly dispersed within the polyamide component, the impact modifier, and/or the single layer fuel tank (10) while retaining an ability to bind, compound, or chelate the polyamide oligomers. Compatibility is typically determined by measuring physical characteristics of the polyamide component, the impact modifier, and/or the single layer fuel tank (10) such as tensile strength, tear resistance, surface smoothness, clarity, and the like. If the modified cyclodextrin is non-compatible, the aforementioned physical properties are typically reduced.

In addition, carbohydrates can be incorporated into the cyclodextrin through $SN_2$ or oxidation reactions at the primary hydroxyl groups to form dialdehyde or acid groups. The secondary hydroxyl groups can also react to form a modified cyclodextrin. In addition, one or more α-D-glucopyranoside units of the cyclodextrin can be opened to allow oxygen atoms therein to become reactive sites. Suitable non-limiting examples of modified cyclodextrins include acylated cyclodextrins, alkylated cyclodextrins, cyclodextrin esters such as tosylates, mesylate and other related sulfo derivatives, hydrocarbyl-amino cyclodextrins, alkyl phosphono and alkyl phosphate cyclodextrins, imidazoyl substituted cyclodextrins, pyridine substituted cyclodextrins, hydrocarbyl sulphur containing cyclodextrins, silicon-containing cyclodextrins, carbonate and carbonate substituted cyclodextrins, carboxylic acid substituted cyclodextrins, and combinations thereof.

Figure 3D:
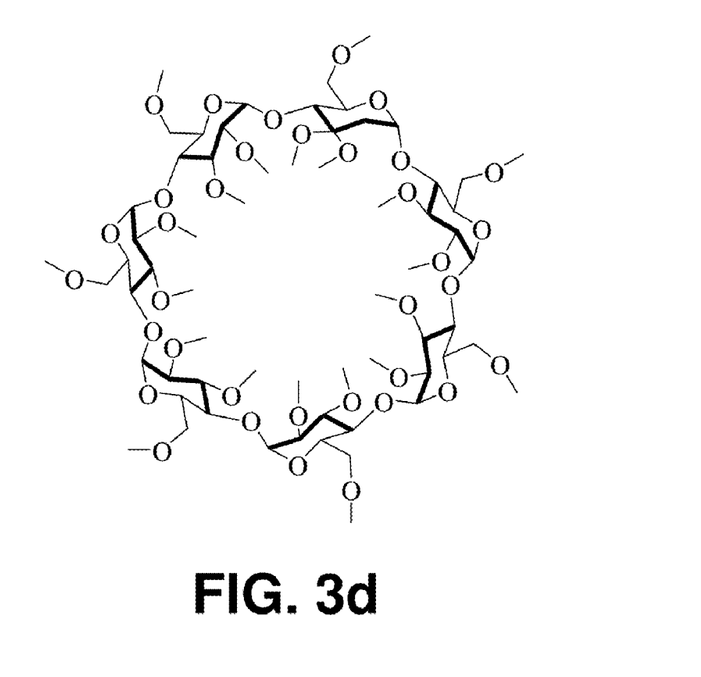
FIG. 3d is a chemical structure of methyl-β-cyclodextrin, which is still another possible binding filler of the instant invention.
Figure 4A:
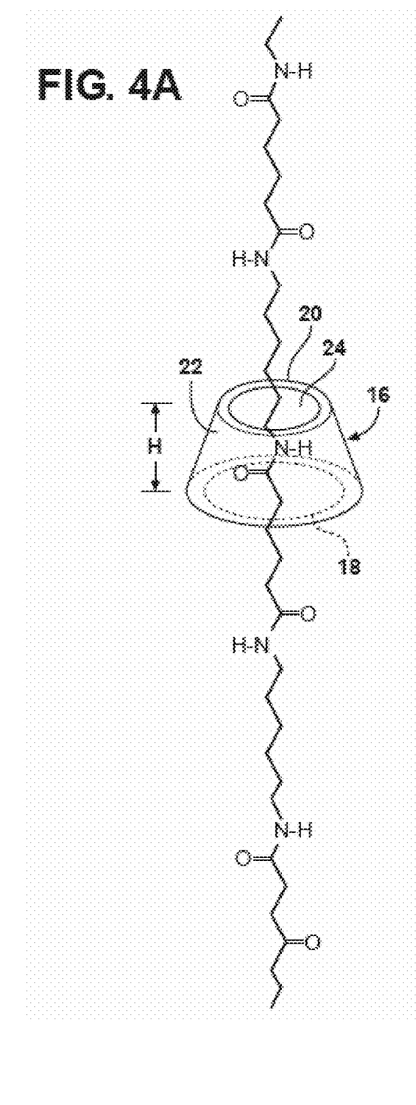
FIGS. 4a and 4b are generic schematics illustrating two toroidal cyclodextrin structures binding poylamide oligomers in a host-guest complex.
Figure 4B:
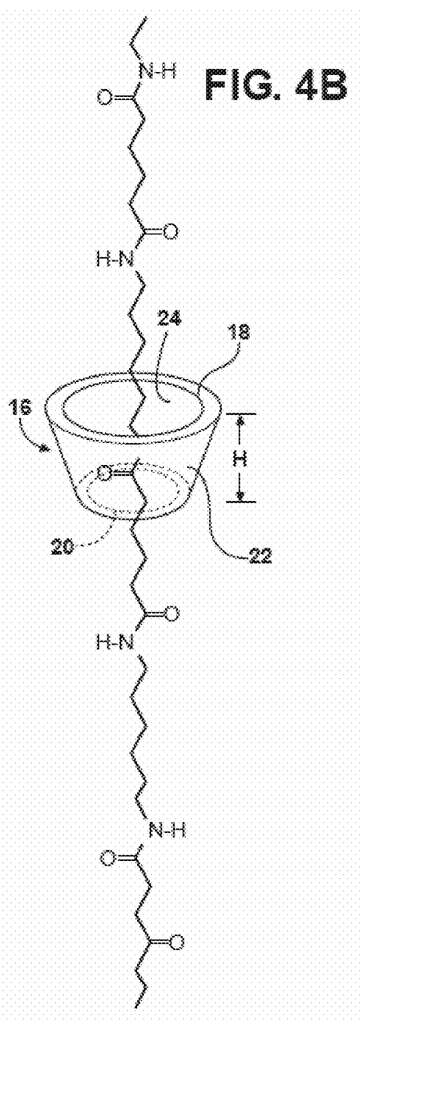

In one embodiment, the binding filler is a modified cyclodextrin that is further defined as methyl-β-cyclodextrin, the chemical structure of which is set forth in FIG. 3d. Particularly suitable but non-limiting cyclodextrins that can be used in this invention are commercially available from Wacker Chemie AG under the trade names of Cavasol® W6 H, Cavasol® W6 HP TL, Cavasol® W7 HP, Cavasol® W7 HP Pharma, Cavasol® W7 HP TL, Cavasol® W7 M, Cavasol® W7 M Pharma, Cavasol® W7 M TL, Cavasol® W8 HP, and Cavasol® W8 HP Pharma. In an alternative embodiment, the binding filler is further defined as methyl-β-cyclodextrin cyclomaltoheptaose, methyl ether having a CAS-No. 128446-36-6, a molecular weight of about 1310 g/mol, a bulk density of about 0.2 to 0.3 g/ml, and a melting range of from about 160° C. to about 190° C. For descriptive purposes only, a general chemical structure of cyclodextrin cyclomaltoheptaose, methyl ether is set forth below wherein each R is $CH_3$ or H:

Without intending to be bound by any particular theory, it is believed that cyclodextrin molecules of this invention form a toroid (16), as set forth in FIGS. 4a and 4b. The toroid (16) typically defines a first opening (18) and a second opening (20). The second opening (20) is typically smaller than the first opening (18) and is disposed opposite the first opening (18). Highly hydrophilic primary and secondary hydroxyl groups of the cyclodextrin are typically exposed to an exterior (22) of the toroid (16) while less hydrophilic groups of cyclodextrin are exposed to an interior (24) of the toroid (16).

Without intending to be bound by any particular theory, it is believed that diameters of the first and second openings (18, 20), in addition to a height (H) of the toroid (16), allow the cyclodextrin to form a host-guest complex (e.g. an inclusion compound) with the polyamide oligomers, as shown in FIGS. 4a and 4b. In FIGS. 4a and 4b, the polyamide oligomers are shown as linear merely for the sake of simplicity. However, and without intending to be bound by any particular theory, it is believed that the polyamide oligomers typically have a "random coil" shape/configuration. As is known in the art, a random coil configuration includes monomer subunits that are oriented randomly while still being bonded to adjacent subunits. In other words, the random coil configuration is not one specific shape, but a statistical distribution of shapes for all chains in a population of polymers, i.e., polyamide oligomers.

Most typically, the diameter of the first opening (18) ranges from 3 to 10 and more typically from 5 to 10 Angstroms (A°). In addition, the diameter of the second opening (20) ranges from 10 to 20 and more typically from 13 to 17 Angstroms (A°). Still further, the height (H) of the toroid (16) typically ranges from 5 to 10 and more typically ranges from 6 to 8 Angstroms (A°). More specifically, the α-, β-, and γ-cyclodextrins, whether modified or unmodified, typically have the following approximate first and second opening diameters and height (H):

| Physical Properties of Toroid (16) | α-cyclodextrin | β-cyclodextrin | γ-cyclodextrin |
|---|---|---|---|
| Diameter of the First Opening (18) (A°) | 5.7 | 7.8 | 9.5 |
| Diameter of the Second Opening (20) (A°) | 13.7 | 15.3 | 16.9 |
| Height of the Cyclodextrin (H) (A°) | 7 | 7 | 7 |

The binding filler is present in the single layer fuel tank (10) but is not covalently bonded to the polyamide. In other words, there is no sharing of valencies between atoms of the binding filler and atoms of the polyamide nor is there any σ-bonding or π-bonding between the binding filler and the polyamide. The binding filler may be hydrogen bonded to the polyamide or be influenced by London Forces or Dipole-Dipole interactions with the polyamide. It is believed that because the binding filler is not covalently bonded to the polyamide, the binding filler (1) can more effectively form host-guest complexes with the polyamide oligomers due to complementary molecular sizes, (2) has more freedom to move and interact with the polyamide component when the fuel tank is being formed thereby more effectively binding the polyamide oligomers, and (3) has additional functional groups available to interact with the polyamide oligomers thereby leading to increased binding, and decreased extraction, of the polyamide oligomers.

As described above, the amount of the binding filler used to form the single layer fuel tank (10) is typically related to the amount of the impact modifier used. Preferably, the binding filler is utilized in an amount sufficient to provide a desired level of binding of the polyamide oligomers and a desired reduction in oligomer extraction by the fuel while simultaneously allowing for a sufficient amount of the impact modifier to be used, as described above. Accordingly, the binding filler is present in the single layer fuel tank (10) in an amount of up to 10 parts, more typically in an amount of from 1 to 10, even more typically in an amount of from 2.5 to 7.5, and most typically in an amount of from 2 to 3, parts by weight per 100 parts by weight of the single layer fuel tank (10).

Furthermore, the single layer fuel tank (10) can also include an additive that is not a polyamide, a polyamide oligomer, an impact modifier, or a binding filler. The additive may include, but is not limited to, oxidative and thermal stabilizers, lubricants, release agents, flame-retarding agents, oxidation inhibitors, oxidation scavengers, neutralizers, anti-block agents, dyes, pigments and other coloring agents, ultraviolet light absorbers and stabilizers, reinforcing agents, nucleators, plasticizers, waxes, hot melt adhesives, and combinations thereof. Representative ultraviolet light stabilizers include, but are not limited to, various substituted resorcinols, salicylates, benzotriazole, benzophenones, and combinations thereof. Suitable lubricants and release agents include, but are not limited to, stearic acid, stearyl alcohol, and stearamides. Exemplary flame-retardants include, but are not limited to, organic halogenated compounds, including decabromodiphenyl ether, inorganic compounds, and combinations thereof. Suitable coloring agents including dyes and pigments include, but are not limited to, cadmium sulfide, cadmium selenide, titanium dioxide, phthalocyanines, ultramarine blue, nigrosine, carbon black and combinations thereof. Representative oxidative and thermal stabilizers include, but are not limited to, metal halides, such as sodium halides, potassium halides, lithium halides, cuprous halides, as well as corresponding chlorides, bromides, and iodides, respectively, and combinations thereof. Also, hindered phenols, hydroquinones, aromatic amines, and combinations thereof may be included. Exemplary plasticizers include, but are not limited to, lactams such as caprolactam and lauryl lactam, sulfonamides such as ortho- and para-toluenesulfonamide and N-ethyl, N-butyl benylnesulfonamide, and combinations thereof, as well as other plasticizers known in the art. If utilized, the additive is typically present in an amount of from 1 to 15, more typically in an amount of from 2.5 to 10, and most typically in an amount of from 5 to 7.5, parts by weight per 100 parts by weight of the single layer fuel tank (10).

In various embodiments, the single layer fuel tank (10) has the physical properties set forth below ± about 10%. Of course, the instant invention is not limited to such properties. That is, the single layer fuel tank (10), according to this invention, may have physical properties that have different values than below. Alternatively, the single layer fuel tank (10) may have different physical properties altogether than those listed below.

| Physical Property | Approximate Value | Test Method |
|---|---|---|
| Density | 1.09 g/cm³ | ISO 1183 |
| Molding Shrinkage: | | ISO 294-4 |
| Across Flow: 0.0787 in. | 1.5% | |
| Flow: 0.0787 in | 2.3% | |
| Water Absorption | | |
| 24 hr; 73° F. | 1.1% | ASTM D570; ISO 62 |
| Equilibrium, 73° F., 50% RH | 2.0% | ISO 62 |
| Tensile Modulus | | ISO 527-2 |
| −40° F. | 308000 psi | |
| 32° F. | 307000 psi | |
| 73° F. | 261000 psi | |
| 212° F. | 57900 psi | |
| 250° F. | 58900 psi | |
| Tensile Stress | | ISO 527-2 |
| Yield; −40° F. | 11300 psi | |
| Yield; 32° F. | 8410 psi | |
| Yield; 73° F. | 6820 psi | |
| Yield; 212° F. | 3920 psi | |
| Yield; 250° F. | 4210 psi | |
| 50% Strain, 73° F. | 6530 psi | |
| Tensile Strain | | |
| Yield; −40° F. | 10% | ISO 527-2 |
| Yield; 32° F. | 9.0% | ISO 527-2 |
| Yield; 73° F. | 4.0% | ISO 527-2 |
| Yield; 212° F. | 34% | ISO 527-2 |
| Yield; 250° F. | 50% | ISO 527-2 |
| 50% Strain, 73° F. | 74% | ISO 527-2/50 |
| Nominal Tensile Strain at Break | | ISO 527-2 |
| −40° F. | 18% | |
| 32° F. | 30% | |
| 73° F. | 50% | |
| 212° F. | >50% | |
| 250° F. | >50% | |
| Flexural Modulus | | ISO 178 |
| −40° F. | 312000 psi | |
| 32° F. | 280000 psi | |
| 73° F. | 276000 psi | |
| 212° F. | 100000 psi | |
| 250° F. | 34800 psi | |
| Charpy Notched Impact Strength | | ISO 179/1eA |
| −40° F. | 9.52 ft.lb/in² | |
| 73° F. | 36.2 ft.lb/in² | |
| Charpy Unnotched Impact Strength 73° F. | No Break | ISO 179/1eU |
| Notched Izod Impact Strength | | ISO 180/1A |
| −40° F. | 8.09 ft.lb/in² | |
| −22° F. | 9.04 ft.lb/in² | |
| −4° F. | 9.99 ft.lb/in² | |

-continued

| Physical Property | Approximate Value | Test Method |
|---|---|---|
| 32° F. | 14.3 ft.lb/in$^2$ | |
| 73° F. | 33.8 ft.lb/in$^2$ | |
| Unnotched Izod Impact Strength 73° F. | No Break | ISO 180/1U |
| Rockwell Hardness (R-Scale) | 107 | ISO 2039-2 |
| Heat Deflection Temperature | | |
| 66 psi, Unannealed | 297° F. | ISO 75-2/B |
| 264 psi; Unannealed | 142° F. | ISO 75-2/A |
| Melting Temperature (DSC) | 504° F. | ISO 11357-3 |
| Coefficient of Linear Thermal Expansion | | ATSM E831 ISO 11359-2 |
| Flow: −40° F. to 73° F. | 0.000067 in/in/° F. | |
| Flow: −22° F. to 86° F. | 0.000067 in/in/° F. | |
| Flow: 73° F. to 131° F. | 0.000078 in/in/° F. | |
| Flow: 131° F. to 320° F. | 0.00011 in/in/° F. | |
| Transverse: −40° F. to 73° F. | 0.000056 in/in/° F. | |
| Transverse: −22° F. to 86° F. | 0.000061 in/in/° F. | |
| Transverse: 73° F. to 131° F. | 0.000067 in/in/° F. | |
| Transverse: 131° F. to 320° F. | 0.000072 in/in/° F. | |
| Flame Rating (UL)/ Flammability Classification | HB | UL 94; IEC 60695-11-10, -20 |

The instant invention also provides a method of forming the single layer fuel tank (10). The method includes the step of combining the polyamide component, the impact modifier, and the binding filler to form a mixture. The method also includes the step of forming the single layer fuel tank (10) from the mixture. The step of forming the single layer fuel tank (10) is not limited and may include any method known in the art including, but not limited to, extruded sheet and film methods, cast film methods, blown film methods, tubing methods, profile methods, crosshead extrusion methods, blow molding methods, calendaring methods, thermoforming methods, and combinations thereof. In one embodiment, the step of forming is further defined as extruding. In another embodiment, the step of forming is further defined as thermoforming. In still another embodiment, the step of forming is further defined as injection molding.

The step of extruding may be further defined as simultaneously extruding the polyamide component, the impact modifier, and/or the binding filler from a single extruder or from different extruders. Alternatively, the step of extruding may be further defined as extruding the polyamide component, the impact modifier, and the binding filler at different times from the same extruder or from different extruders. The extruder is typically a single or twin screw extruder but may be any extruder known in the art. The conditions of extruding may be any known in the art.

Typically, thermoforming creates single layer fuel tanks (10) from already extruded sheets of the polyamide component, the impact modifier, and the binding filler through application of vacuum and/or heat. In one embodiment, the step of thermoforming includes an automatic high speed positioning of a sheet or film of the polyamide component, the impact modifier, and the binding filler having an accurately controlled temperature into a pneumatically actuated forming station whereby a shape of the sheet or film is defined by a mold. The sheet or film, after being positioned, may be trimmed or cut, as is known in the art. A variety of techniques can be used including, but not limited to, use of a drape, vacuum, pressure, matched die, billow drape, vacuum snapback, billow vacuum, plug assist vacuum, reverse draw with plug assist, trapped sheet, slip, diaphragm, twin-sheet cut sheet, and combinations thereof. The step of thermoforming may also utilize a freeblowing technique, a pressure bubble immersion technique, a twin-sheet roll-fed technique, a pillow-forming technique, a blow-molding technique, an extrusion blow-molding technique, and combinations thereof. Specifically, blow-molding includes expanding a heated parison against surfaces of a mold using compressed gasses.

The single layer fuel tank (10) may also be formed via injection molding. The conditions used in injection molding may be any known in the art. Typically, injection molding is further defined as melting pellets of the polyamide component, the impact modifier, and the binding filler in a zone of an extruder to form a molten mixture thereof and forcing the molten mixture into either an open or closed mold using pressure. The molten mixture typically takes the shape of the mold. Then, the molten mixture cools, is removed from the mold, and solidifies. In various embodiments, the single layer fuel tank (10) is formed via injection molding wherein two halves of the single layer fuel tank (10) are formed and subsequently connected together by welding, melting with heat, or bonding with solvent.

In addition to the single layer fuel tank (10), the instant invention also provides a fuel tank assembly that includes the single layer fuel tank (10) described above and a sheath disposed on the single layer fuel tank (10). The sheath may act as an outer surface of the fuel tank assembly. The sheath may be formed using any technique known in the art including, but not limited to, those described above. The sheath may include, consist essentially of, or consist of low density polyethylene (LDPE), linear low density polyethylene (LLDPE), high density polyethylene (HDPE), polypropylene, polyamides, nitrites, poly(ethylene-co-terephthalate), PETG, polycarbonate, polyesters such as poly(ethylene-co-terephthalate), poly(ethylene-co-1,4-naphthalene dicarboxylate), poly(butylene-co-terephthalate), PVC, PVDC, poly(acrylonitrile-co-butadiene-co-styrene) polymers, acrylic polymers such as polymethylmethacrylate, poly-n-butyl acrylate, poly(ethylene-co-acrylic acid), poly(ethylene-co-methacrylate), cellophane, cellulosics including cellulose acetate, cellulose acetate propionate, cellulose acetate butyrate and cellulose triacetate, fluoropolymers including polytetrafluoroethylene, poly(ethylene-co-tetrafluoroethylene) copolymers, (tetrafluoroethylene-co-propylene) copolymers, polyvinyl fluoride polymers, polyimides, polystyrene, polysulfone, polyphenylene sulfide, polyphenylene oxide, liquid crystal polyesters, polyether ketones, polyvinylbutyral, and combinations thereof. The sheath typically has a thickness of from 0.03 to 0.25, more typically of from 0.08 to 0.17, and most typically of from 0.1 to 0.15, inches.

A method of forming the fuel tank assembly includes the steps described above relative to the formation of the single layer fuel tank (10). This method also includes the step of forming the sheath on the single layer fuel tank (10). Additional layers can also be formed on the sheath and may be formed using any polymer described above. In addition, the second, third, and/or additional layers may be formed using the methods described above.

The instant invention further provides a method of reducing an amount of extracted polyamide in a fuel having at least 10 percent by volume of ethanol. This method includes the same two steps described above of combining the polyamide component, the impact modifier, and the binding filler to form the mixture and forming the single layer fuel tank (10) from the mixture. This method also includes the steps of adding the fuel to the single layer fuel tank (10) and retaining the fuel in the single layer fuel tank (10). Typically, the fuel is retained in the single layer fuel tank (10) for at least one week and more typically at least two weeks. However, the fuel may be retained for any amount of time. Without intending to be bound by any particular theory, it is believed that an amount of the polyamide oligomers extracted from the fuel tank is, at least in part, dependent on heat. That is, polyamide oligomers are typically extracted more rapidly at high temperatures than at low temperatures. After the fuel is retained, the fuel is removed from the single layer fuel tank (10) and has a minimized amount of extracted polyamide oligomers therein. The fuel may be removed from the single layer fuel tank (10) and passed through a fuel filter, which may be any known in the art. Particularly suitable fuel filters are commercially available from Briggs and Stratton and Flambeau. Without intending to be bound by any particular theory, it is believed that the binding filler in the single layer fuel tank (10) reduces an amount of the polyamide oligomers that are extracted into the fuel and thereby minimizes clogging and flow rate reduction of the fuel filters that are commonly associated with polyamide oligomers present in the fuel.

EXAMPLES

The following Examples demonstrate the efficacy of this invention but are not intended to limit this invention in any way. In a first series of examples, tensile bars are formed and used to demonstrate reduced extraction of polyamide oligomers therefrom. In a second series of examples, single layer fuel tanks are formed and used to demonstrate that fuel contained therein includes a minimized amount of extracted polyamide oligomers. In addition, the fuel from the single layer fuel tanks can be passed through a fuel filter with minimized clogging and minimized flow rate reduction.

Formation of Tensile Bars: Reduced Extraction of Polyamide Oligomers

Two tensile bars (Tensile Bars 1 and 2) are formed and include the polyamide component, impact modifier, and binding filler of this invention. An additional comparative tensile bar (Comparative Tensile Bar 1) is also formed but does not include the binding filler of this invention. Compositions used to form the Tensile Bars 1 and 2 and the Comparative Tensile Bar 1 are set forth in Table 1 below wherein all values are in parts by weight unless otherwise indicated.

TABLE 1

| Polyamide Component | Tensile Bar 1 | Tensile Bar 2 | Comparative Tensile Bar 1 |
|---|---|---|---|
| Polyamide 1 | 75.15 | 73.65 | 76.65 |
| Impact Modifier 1 | 20 | 20 | 20 |
| Additive 1 | 0.6 | 0.6 | 0.6 |
| Additive 2 | 2 | 2 | 2 |
| Additive 3 | 0.75 | 0.75 | 0.75 |
| Binding Filler 1 | 1.5 | 3.0 | 0 |

Polyamide 1 is polyamide 6,6 commercially available from BASF Corporation under the trade name of Ultramid® A 3192.

The Polyamide Oligomers (%) is a measure of dimers, trimers, tetramers, pentamers, hexamers, heptamers, octamers, nonamers, and decamers of caprolactam, hexamethylene diamine, adipic acid, nylon 6, nylon 6,6, and/or combinations thereof, present in the Polyamide Component, as described above. The Polyamide Oligomers (%) is determined using HPLC after extraction with solvents.

Impact Modifier 1 is ethylene propylene rubber (EPR) that is commercially available from Exxon Mobile under the trade name of Exxelor®.

Additive 1 is a heat stabilizer that is commercially available from Ciba under the trade name of Irganox®.

Additive 2 is a carbon black pigment.

Additive 3 is a lubricant.

Binding Filler 1 is methyl-β-cyclodextrin that is commercially available from Wacker under the trade name of Cavasol® W7M.

Each of the Tensile Bars 1 and 2 and the Comparative Tensile Bar 1 are formed from compounding the Polyamide Component, the Impact Modifier, and the Binding Filler (where appropriate). As is well known in the art, compounding is a technique to prepare mixtures. Here, a twin-screw extruder is used to form strands of the mixture of the Polyamide Component, the Impact Modifier, and the Binding Filler. The twin-screw extruder includes two screws that rotate at a certain speed (RPM) in a metal barrel to move the mixture of the Polyamide Component, the Impact Modifier, and the Binding Filler through the barrel. The barrel provides a bearing surface where shear is imparted to the mixture of the Polyamide Component, the Impact Modifier, and the Binding Filler. Heating media are housed around the barrel and establish temperature zones in the barrel that are varied according to processing conditions known to those of skill in the art. More specifically, the Polyamide Component, the Impact Modifier, and the Binding Filler (where appropriate) are added to the twin-screw extruder in a first zone (Zone 1) and passed through a series of nine additional zones (Zones 2-10) that are heated to varying temperatures. Then, the mixture of the Polyamide Component, the Impact Modifier, and the Binding Filler is pushed through a strand die to form the strands that are cooled to solidify in a water tank. Subsequently, the strands are fed into a pelletizer to create pellets which are then stored for use in injection molding, as described in detail below. The specific compounding conditions are set forth in Table 2 below.

TABLE 2

| Zone 1 Temperature (° C.) | 265 |
|---|---|
| Zone 2 Temperature (° C.) | 265 |
| Zone 3 Temperature (° C.) | 275 |
| Zone 4 Temperature (° C.) | 275 |
| Zone 5 Temperature (° C.) | 275 |
| Zone 6 Temperature (° C.) | 275 |
| Zone 7 Temperature (° C.) | 275 |
| Zone 8 Temperature (° C.) | 285 |
| Zone 9 Temperature (° C.) | 285 |
| Zone 10 Temperature (° C.) | 285 |
| Die Temperature (° C.) | 285 |
| Speed Torque (RPM) | 400 |
| Torque (Amper) | 80 |
| Production Rate (lb/h) | 50 |
| Melt Temperature (° C.) | 285 |

Figure 5:
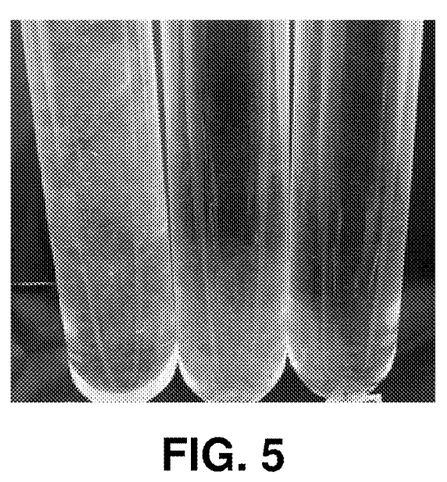
FIG. 5 is a photograph of three test tubes and illustrates amounts of extracted polyamide oligomers present in a fuel (represented by cloudiness of the fuel) in the test tubes wherein, from right to left, the fuels include polyamide oligomers extracted from Tensile Bars 1 and 2 and Comparative Tensile Bar 1 of the Examples.

After formation, the Tensile Bars 1 and 2 and the Comparative Tensile Bar 1 are placed in separate test tubes (Test Tubes 1-3, respectively) and immersed in 43 ml of CE20 fuel (40 wt % toluene, 40 wt % iso-octane, and 20 wt % ethanol). Immersion in the fuel is used to determine an amount of Polyamide Oligomers extracted from the Tensile Bars. Each of Test Tubes 1-3 are capped and heat-aged at 104° F. for 168 hours. Subsequently, the Test Tubes are cooled to room temperature and the CE20 fuel is allowed to evaporate for 3 days. After 3 days, Test Tubes 1-3 are visually evaluated to determine an approximate amount of Polyamide Oligomers extracted from the Tensile Bars 1 and 2 and Comparative Tensile Bar 1 by the CE20 fuel. As shown in FIG. 5 from right to left, a minimized amount of Polyamide Oligomers is extracted in Test Tubes 1 and 2 (corresponding to Tensile Bars 1 and 2 of this invention)

and an increased amount of Polyamide Oligomers is extracted in Test Tube 3 (corresponding to Comparative Tensile Bar 1).

Formation of Single Layer Fuel Tanks: Minimized Clogging/Flow Rate Reduction of Fuel Filters In addition to the Tensile Bars, two single layer fuel tanks (Tanks 1 and 2) are formed according to this invention and by the method of this invention. Two comparative single layer fuel tanks (Comparative Tanks 1 and 2) are also formed but not according to this invention, i.e., without the binding filler of this invention. More specifically, the Tanks 1 and 2 and the Comparative Tanks 1 and 2 are formed via injection molding followed by vibration welding.

The compositions of each of the Tanks 1 and 2 and the Comparative Tanks 1 and 2 are set forth in Table 3 below wherein all values are in parts by weight unless otherwise indicated.

TABLE 3

| | Tank 1 | Tank 2 | Comparative Tank 1 | Comparative Tank 2 |
|---|---|---|---|---|
| Polyamide Component | | | | |
| Polyamide 1 | 71.65 | 71.65 | 76.65 | — |
| Polyamide 2 | — | — | — | 100 |
| Impact Modifier 2 | 20 | 20 | 20 | — |
| Additive 1 | 0.6 | 0.6 | 0.6 | — |
| Additive 2 | 2 | 2 | 2 | — |
| Additive 3 | 0.75 | 0.75 | 0.75 | — |
| Binding Filler | | | | |
| Binding Filler 2 | 5 | — | — | — |
| Binding Filler 3 | — | 5 | — | — |

Polyamide 2 is polyamide 6,6 commercially available from DuPont under the trade name of Zytel® ST801A.

Impact Modifier 2 is ethylene octene that is commercially available from Dupont under the trade name of Fusabond®.

Binding Filler 2 includes silica and aluminum oxide and is commercially available from 3M under the trade name Zeeosphere® G200.

Binding Filler 3 is a synthetic amorphous silica that is commercially available from PPG under the trade name Hi-sil® ABS.

After formation, each of the Tanks 1 and 2 and the Comparative Tanks 1 and 2 are filled with fuel, which is heat aged in the Tanks and used in subsequent tests that are described in greater detail below. More specifically, each of the Tanks 1 and 2 and the Comparative Tanks 1 and 2 are filled to approximately 80 percent of a total volume with the CE20 fuel, capped with a fuel cap, and heat-aged at 104° F. for 168 hours.

In addition, four Briggs and Stratton fuel filters (Filters 1 and 2 and Comparative Filters 1 and 2) are each individually attached to a glass pipette which is filled with 100 ml of Fuel C (50 wt % toluene and 50 wt % iso-octane). Valves on the filled pipettes are then opened and amounts of the Fuel C are independently passed through each of the Filters 1 and 2 and Comparative Filters 1 and 2. Times required for 30 ml of Fuel C (from 70 ml to 40 ml on the pipettes) to pass through each of the Filters 1 and 2 and Comparative Filters 1 and 2 are recorded as $T_i$. Subsequently, initial flow rates for Fuel C ($F_i$) are calculated using the equation:

$$F_i = 30/T_i$$

Then, the Filters 1 and 2 and Comparative Filters 1 and 2 are dried in an over at 104° F. for at least 168 hours to "precondition" the fuel filters for use in a subsequent test.

After the Tanks 1 and 2 and the Comparative Tanks 1 and 2 are heat-aged at 104° F. for 168 hours, as described above, the CE20 fuel from each tank is drained into separate open mouthed containers and allowed to evaporate at 104° F. to approximately 25 wt % of original mass. Subsequently, the CE20 fuel from each of the Tanks 1 and 2 and Comparative Tanks 1 and 2 is passed through the pre-conditioned Filters 1 and 2 and Comparative Filters 1 and 2, respectively. After the CE20 fuel is passed through the Filters, each of the Filters 1 and 2 and the Comparative Filters 1 and 2 is attached to separate glass pipettes which are each filled with 100 ml of Fuel C. Valves on the filled pipettes are then opened and amounts of the Fuel C are passed through the Filters 1 and 2 and the Comparative Filters 1 and 2. A time required for 30 ml of Fuel C (from 70 ml to 40 ml on the pipettes) to pass through the Filters is recorded as $T_f$ and used to calculate final flow rates for Fuel C ($F_f$) using the following equation:

$$F_f = 30/T_f$$

Subsequently, percentage flow rate reductions are calculated using the following equation:

$$\text{Percentage Flow Rate Reduction} = [F_f \div F_i] \times 100$$

The Percentage Flow Rate Reductions for the Filters 1 and 2 and the Comparative Filters 1 and 2, which correspond to the Tanks 1 and 2 and the Comparative Tanks 1 and 2, are set forth in Table 4 below.

TABLE 4

| | Filter 1/ Tank 1 | Filter 2/ Tank 2 | Comparative Filter 1/ Comparative Tank 1 | Comparative Filter 2/ Comparative Tank 2 |
|---|---|---|---|---|
| Percentage Flow Rate Reduction (%) | −4.17 | 7.44* | 65.13 | 92.06 |

*Median of two independent evaluations of Percentage Flow Rate Reduction

Figure 6:
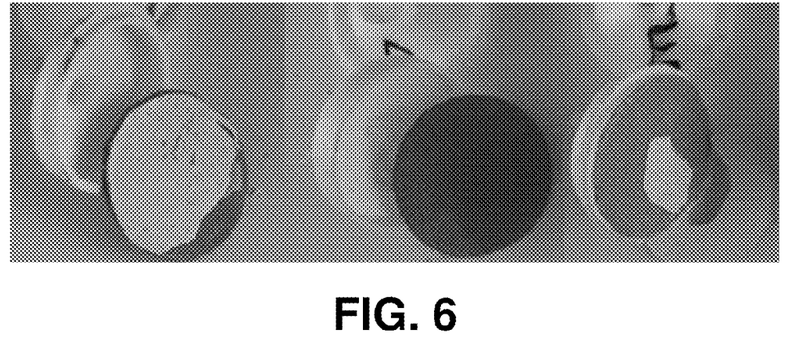
FIG. 6 is a photograph of three fuel filters and illustrates amounts of extracted polyamide oligomers present in the fuel filters wherein, from left to right, the fuel filters include polyamide oligomers extracted from Comparative Fuel Tank 1, Fuel Tank 1, and Comparative Fuel Tank 2 of the Examples.

In addition, pictorial results of this evaluation are set forth in FIG. 6 wherein the Comparative Filter 1 is set forth on the left, Filter 1 is set forth in the middle, and Comparative Filter 2 is set forth on the right. As shown in this Figure, Filter 1 shows a negligible, if any, Percentage Flow Rate Reduction. In fact, the data suggest that flow rate actually increases after use of the Tank 1 of this invention.

The results set forth above indicate that the binding filler of this invention reduces an amount of polyamide oligomers extracted into a fuel, as shown in FIG. 5. The results also indicate that use of the binding filler to form single layer fuel tanks allows fuel held therein to be used in fuel filters with minimized clogging and minimized flow rate reduction that are typically associated with polyamide oligomers present in the fuel, as shown in FIG. 6.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A single layer fuel tank comprising:
   A. a polyamide component having;
      i. a polyamide selected from the group of polyamide 6, polyamide 6,6, polyamide 6/66, and combinations thereof; and
      ii. up to 5 parts by weight of polyamide oligomers having a number average molecular weight of less than about 3,000 g/mol per 100 parts by weight of said polyamide component;
   B. an impact modifier that is an organic copolymer and that is present in an amount of up to 30 parts by weight per 100 parts by weight of said single layer fuel tank; and
   C. a binding filler comprising at least one of a silica and a cyclodextrin and present in an amount of up to 10 parts by weight per 100 parts by weight of said single layer fuel tank, wherein said binding filler is not covalently bonded to said polyamide.

2. A single layer fuel tank as set forth in claim 1 further comprising a fuel having at least 10 percent by volume of ethanol.

3. A method of forming the single layer fuel tank set forth in claim 1 comprising the steps of combining the polyamide component, the impact modifier, and the binding filler to form a mixture, and forming the fuel tank from the mixture.

4. A machine comprising said single layer fuel tank of claim 1.

5. A fuel tank assembly comprising said single layer fuel tank as set forth in claim 1 and a sheath disposed on said single layer fuel tank, said sheath comprising a polymer.

6. A single layer fuel tank as set forth in claim 1 consisting essentially of said polyamide component, said impact modifier, and said binding filler.

7. A single layer fuel tank as set forth in claim 6 wherein said impact modifier is present in an amount of from 15 to 25 parts by weight per 100 parts by weight of said single layer fuel tank and said binding filler is present in an amount of from 2.5 to 7.5 parts by weight per 100 parts by weight of said single layer fuel tank.

8. A single layer fuel tank as set forth in claim 7 wherein said binging fillr comprises silica.

9. A single layer fuel tank as set forth in claim 8 wherein said binding filler consists essentially of silica.

10. A single layer fuel tank as set forth in claim 9 wherein said binding filler consists of silica.

11. A single layer fuel tank as set forth in claim 7 wherein said binding filler comprises silica and aluminum oxide.

12. A single layer fuel tank as set forth in claim 11 wherein said binding filler consists essentially of silica and aluminum oxide.

13. A single layer fuel tank as set forth in claim 7 wherein said binding filler comprises a cyclodextrin.

14. A single layer fuel tank as set forth in claim 13 wherein said binding filler consists essentially of methyl-β-cyclodextrin.

15. A single layer fuel tank as set forth in claim 14 wherein said binding filler consists of methyl-β-cyclodextrin.

16. A single layer fuel tank as set forth in claim 1 wherein said binding filler comprises silica.

17. A single layer fuel tank as set forth in claim 16 wherein said binding filler consists essentially of silica.

18. A single layer fuel tank as set forth in claim 17 wherein said binding filler consists of silica.

19. A single layer fuel tank as set forth in claim 1 wherein said binding filler comprises silica and aluminum oxide.

20. A single layer fuel tank as set forth in claim 19 wherein said binding filler consists essentially of silica and aluminum oxide.

21. A single layer fuel tank as set forth in claim 1 wherein said binding filler comprises a cyclodextrin.

22. A single layer fuel tank as set forth in claim 21 wherein said binding filler consists essentially of methyl-β-cyclodextrin.

23. A single layer fuel tank as set forth in claim 22 wherein said binding filler consists of methyl-β-cyclodextrin.

24. A method of minimizing an amount of extracted polyamide oligomers in a fuel having at least 10 percent by volume of ethanol, said method comprising the steps of:
   A. combining a polyamide component, an impact modifier, and a binding filler to form a mixture, wherein the polyamide component is selected from the group of polyamide 6, polyamide 6,6, polyamide 6/66, and combinations thereof and has up to 5 parts by weight of polyamide oligomers having a number average molecular weight of less than about 3,000 g/mol per 100 parts by weight of the polyamide component, wherein the impact modifier is an organic copolymer that is present in an amount of up to 30 parts by weight per 100 parts by weight of the single layer fuel tank, wherein the binding filler comprises at least one of a silica and a cyclodextrin and is present in an amount of up to 10 parts by weight per 100 parts by weight of the single layer fuel tank, and wherein the filler is not covalently bonded to the polyamide;
   B. forming a single layer fuel tank from the mixture;
   C. adding and retaining the fuel in the single layer fuel tank; and
   D. removing the fuel from the single layer fuel tank, wherein the fuel has a minimized amount of extracted polyamide oligomers therein.

25. A method as set forth in claim 24 further comprising the step of passing the removed fuel through a fuel filter.

* * * * *

UNITED STATES PATENT AND TRADEMARK OFFICE
CERTIFICATE OF CORRECTION

| | | |
|---|---|---|
| PATENT NO. | : 8,092,884 B2 | Page 1 of 1 |
| APPLICATION NO. | : 12/496913 | |
| DATED | : January 10, 2012 | |
| INVENTOR(S) | : Zhenguo Liu et al. | |

It is certified that error appears in the above-identified patent and that said Letters Patent is hereby corrected as shown below:

Column 17, line 41, after "wherein said," delete "binging fillr" and insert therein
-- binding filler --.

Signed and Sealed this
Thirty-first Day of July, 2012

David J. Kappos
*Director of the United States Patent and Trademark Office*